United States Patent
Park et al.

(10) Patent No.: US 8,050,682 B2
(45) Date of Patent: Nov. 1, 2011

(54) METHOD AND SYSTEM FOR DELIVERING AND CONSTRUCTING STATUS INFORMATION IN COMMUNICATION SYSTEM

(75) Inventors: Jung-Shin Park, Seoul (KR); Ji-Cheol Lee, Yongin-si (KR); Hyoung-Kyu Lim, Seoul (KR); Seon-Goo Hwang, Yongin-si (KR); Sung-Tak Jang, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 828 days.

(21) Appl. No.: 12/148,217

(22) Filed: Apr. 16, 2008

(65) Prior Publication Data

US 2009/0233606 A1 Sep. 17, 2009

(30) Foreign Application Priority Data

Mar. 14, 2008 (KR) .......................... 10-2008-0024084

(51) Int. Cl.
*H04W 36/02* (2009.01)
*H04W 4/00* (2009.01)
(52) U.S. Cl. ......... 455/437; 455/436; 370/331; 370/394
(58) Field of Classification Search ............... 455/412.1, 455/436–434
See application file for complete search history.

(56) References Cited

U.S. PATENT DOCUMENTS

| | | | |
|---|---|---|---|
| 2002/0181437 A1* | 12/2002 | Ohkubo et al. | 370/349 |
| 2007/0079207 A1 | 4/2007 | Seidel et al. | |
| 2007/0242681 A1* | 10/2007 | Kono et al. | 370/401 |
| 2007/0286125 A1* | 12/2007 | Lee et al. | 370/331 |
| 2007/0293254 A1 | 12/2007 | Jiang | |
| 2008/0108354 A1* | 5/2008 | Nagata | 455/438 |
| 2008/0123673 A1* | 5/2008 | Lee | 370/412 |
| 2008/0192696 A1* | 8/2008 | Sachs et al. | 370/331 |
| 2008/0310367 A1* | 12/2008 | Meylan | 370/331 |

FOREIGN PATENT DOCUMENTS

| | | |
|---|---|---|
| JP | 2007-502558 | 2/2007 |
| JP | 2008-005491 | 10/2008 |

* cited by examiner

*Primary Examiner* — Nick Corsaro
*Assistant Examiner* — Tangela T. Chambers

(57) ABSTRACT

Disclosed is a method for delivering buffer status information to a target base station, to which a mobile station has decided to hand over, by a serving base station in a communication system. The method includes the steps of constructing buffer status information containing a first parameter indicating the number of a smallest packet among packets within a predetermined section stored in a buffer, a second parameter indicating the number of a packet to be transmitted at a next point of time, a third parameter indicating the number of a first packet, the lifetime of which has not yet expired, and a fourth parameter indicating whether or not an instruction to initialize the buffer status information has been transmitted to the mobile station; and transmitting a message containing the constructed buffer status information to the target base station.

20 Claims, 3 Drawing Sheets

<SERVING BASE STATION'S ARQ BUFFER STATUS (TX (TRANSMISSION) BUFFER)>

<SERVING BASE STATION'S ARQ BUFFER STATUS (RX (RECEPTION) BUFFER)>

METHOD AND SYSTEM FOR DELIVERING AND CONSTRUCTING STATUS INFORMATION IN COMMUNICATION SYSTEM

CROSS-REFERENCE TO RELATED APPLICATION(S) AND CLAIM OF PRIORITY

This application claims priority to an application entitled "Method and System for Delivering and Constructing Status Information in Communication System" filed with the Korean Intellectual Property Office on Mar. 14, 2008 and assigned Serial No. 2008-24084, the contents of which are incorporated herein by reference.

TECHNICAL FIELD OF THE INVENTION

The present invention relates to a communication system, and more particularly to a method and a system for delivering and constructing status information in a communication system.

BACKGROUND OF THE INVENTION

Generally, handovers in communication systems are important research topics. When a mobile station decides to conduct a handover, the mobile station transmits a handover request message to the serving base station. In response to the handover request, the base station transmits a handover acknowledgement (ACK) message to the mobile station. After receiving the handover ACK message, the mobile station determines a target base station, to which a handover is to be conducted, and transmits a handover indication message, which contains information regarding the determined target base station, to the serving base station.

A handover procedure in a communication system will now be described with reference to FIG. 1.

FIG. 1 is a flowchart showing a handover procedure in a communication system according to the prior art.

Referring to FIG. 1, the mobile station (MS) 100 receives a MOB_NBR-ADV (mobile neighbor advertisement) message from the serving base station 120, from which the MS 100 is currently receiving a service. After receiving the MOB_NBR-ADV message, the MS 100 conducts a scanning operation for measuring the signal intensity with regard to the serving base station 120 and target base stations 140 and 160 (step 103). After completing the scanning operation, the MS 100 transmits a MOB_MSHO-REQ (mobile mobile station handover request) message to the serving base station 120 (step 105).

The serving base station 120 transmits HO_notification (handover notification) messages to the first and second target base stations 140 and 160 to inform that the MS 100 may hand over (steps 107 and 109).

The first and second target base stations 140 and 160 transmit messages containing responses to the HO_notification messages to the serving base station 120 (steps 111 and 113).

The serving base station 120 transmits a MOB_BSHO-RSP (mobile base station handover response) message, which contains information regarding services the target base stations 140 and 160 can provide, to the MS 100 (step 115).

The MS 100 transmits a MOB_HO-IND (mobile handover indication) message to the serving base station 120 to inform that the MS 100 will hand over to the second target base station 160 (step 117).

After receiving the MOB_HO-IND message, the serving base station 120 transmits a HO_confirm (handover confirmation) message to the second target base station 160 to inform that the MS 100 will hand over to the second target base station 160 (step 119).

After receiving the MOB_HO-IND message, the serving base station 120 stops transmitting packets to the MS 100. In addition, the serving base station 120 adds information regarding the session of the MS 100 to the HO_confirm message and transmits it so that the MS 100 is continuously provided with the service from the second target base station 160 after completing the handover.

In some cases in which the MS can not transmit MOB_M-SHO-REQ or MOB_HO-IND to the serving base station, the MS may proceed with network reattachment process at the target base station without any pre-notification. In this case, the target base station shall retrieve MS status information from the serving base station via backhaul communication.

Meanwhile, ARQ (Automatic Repeat Request) refers to a scheme for detecting the loss of frames in MAC (Medium Access Control) layers and retransmitting packets accordingly. Lost frames can be detected from polling or acknowledgements received from the retransmission timer or receiving side. The ARQ scheme can quickly restore lost frames and efficiently guarantee the reliability of radio links.

When the communication system adopts the ARQ scheme, the second target base station 160 must retransmit a packet (i.e., ARQ block) if the serving base station 120 fails to receive an acknowledgement in connection with the packet. In this case, the serving base station 120 must transmit ARQ status information regarding the packet transmission status and the ARG block stored in the buffer to the second target base station 160 so that the second target base station 160 can retransmit necessary ARQ blocks.

One of the easy methods for transmitting the ARQ status information is to transmit status information consisting of every detailed transmission status of each packet to the second target base station 160 by the serving base station 120. In this case, the information regarding the status of each packet may be of MAP type, including paired values of packet sequence numbers and transmission status variables. However, this method has a problem in that the size of the status information increases rapidly in proportion to the number of packets in the buffer and the number of flows. In addition, the fact that the second target base station 160 must conduct 1-to-1 remapping between the transmitted status information and each packet requires a long period of time to restore the status information.

SUMMARY OF THE INVENTION

To address the above-discussed deficiencies of the prior art, it is a primary object of the present invention to solve the above-mentioned problems occurring in the prior art, and it is an aspect of the present invention to provide a method and a system for delivering buffer status information with a reduced size in a communication system.

It is another aspect of the present invention to provide a method and a system for restoring a buffer for a reduced period of time in a communication system.

In order to accomplish these aspects of the present invention, there is provided a method for delivering buffer status information to a target base station by a serving base station in a communication system, a mobile station having decided to hand over to the target base station, the method including the steps of constructing buffer status information containing a first parameter indicating the smallest packet sequence number within a predetermined section stored in a buffer, a second parameter indicating the sequence number of a packet to be transmitted at a next point of time, a third parameter indicating the number of the first packet, whose lifetime has not yet expired, and a fourth parameter indicating whether or not an instruction to initialize the buffer status information has been transmitted to the mobile station; and transmitting a message containing the constructed buffer status information to the target base station.

In accordance with another aspect of the present invention, there is provided a method for constructing a buffer by a target base station in a communication system, the target base station being a target of handover of a mobile station, the method including the steps of receiving a message containing buffer status information from a serving base station, the buffer status information containing a first parameter indicating the smallest packet sequence number within a predetermined section stored in a buffer, a second parameter indicating the sequence number of a packet to be transmitted at a next point of time, a third parameter indicating the number of the first packet, no ACK message having been received from the mobile station in connection with the packet but still remaining valid in ARQ processing, and a fourth parameter indicating whether or not the serving base station has transmitted an instruction to initialize the buffer status information to the mobile station; receiving packets delivered from the serving base station, the packets having been transmitted or supposed to be transmitted to the mobile station by the serving base station; and constructing a buffer based on consideration of the first to fourth parameters and the delivered packets.

In accordance with a further aspect of the present invention, there is provided a method for constructing a buffer by a target base station in a communication system, the target base station being a target of handover of a mobile station, the method including the steps of receiving a message containing buffer status information from a serving base station, the buffer status information containing a first parameter indicating the smallest packet sequence number within a predetermined section stored in a reception buffer, a second parameter indicating the number of a packet to be received at a next point of time, a third parameter indicating the number of the first packet, whose lifetime has not yet expired in the serving base station, and a fourth parameter indicating whether or not the serving base station has transmitted an instruction to initialize the buffer status information to the mobile station; receiving packets delivered from the serving base station, the serving base station having received the packets from the mobile station; and constructing a reception buffer based on consideration of the first to fourth parameters and the delivered packets.

In accordance with a still further aspect of the present invention, there is provided a communication system including a mobile station; a serving base station providing the mobile station with a service; and a target base station, the mobile station having decided to hand over from the serving base station to the target base station, wherein the serving base station constructs buffer status information containing a first parameter indicating the smallest packet sequence number within a predetermined section stored in a buffer, a second parameter indicating the number of a packet to be transmitted at a next point of time, a third parameter indicating the number of a first packet, whose lifetime has not yet expired, and a fourth parameter indicating whether or not an instruction to initialize the buffer status information has been transmitted to the mobile station, and transmits a message containing the constructed buffer status information to the target base station, and the target base station receives a message containing buffer status information from the serving base station, the buffer status information containing a first parameter indicating the smallest packet sequence number within a predetermined section stored in a buffer, a second parameter indicating the number of a packet to be transmitted at a next point of time, a third parameter indicating the number of a first packet, whose lifetime has not yet expired, and a fourth parameter indicating whether or not the serving base station has transmitted an instruction to initialize the buffer status information to the mobile station, receives packets delivered from the serving base station, the packets having been transmitted or supposed to be transmitted to the mobile station by the serving base station, and constructs a buffer based on consideration of the first to fourth parameters and the delivered packets.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

According to the system and method proposed by the present invention, the serving base station constructs condensed ARQ status information in a communication system and delivers the status information to a target base station, to which the mobile station is supposed to hand over, so that the target base station continuously provides the mobile station with a service based on the transmitted status information.

The ARQ status information according to the present invention, i.e., information regarding the status of the ARQ buffer, includes Starting_ARQ_BSN (starting ARQ block sequence number), Last_ARQ_BSN (last ARQ block sequence number), Valid_ARQ_BSN (valid ARQ block sequence number), and Reset_status (reset status).

The ARQ status information can be constructed by selecting major parameters indicating the buffer status based on consideration of the ARQ window, and expressing the packet transmission and reception status of the serving base station based on the selected parameters. Generally, the ARQ window refers to the maximum number of ARQ blocks that the serving base station can transmit regardless of whether or not an ACK message is received from the mobile station.

It will be assumed in the following description that the mobile station (MS) hands over from the serving base station to a target base station.

Figure 1:
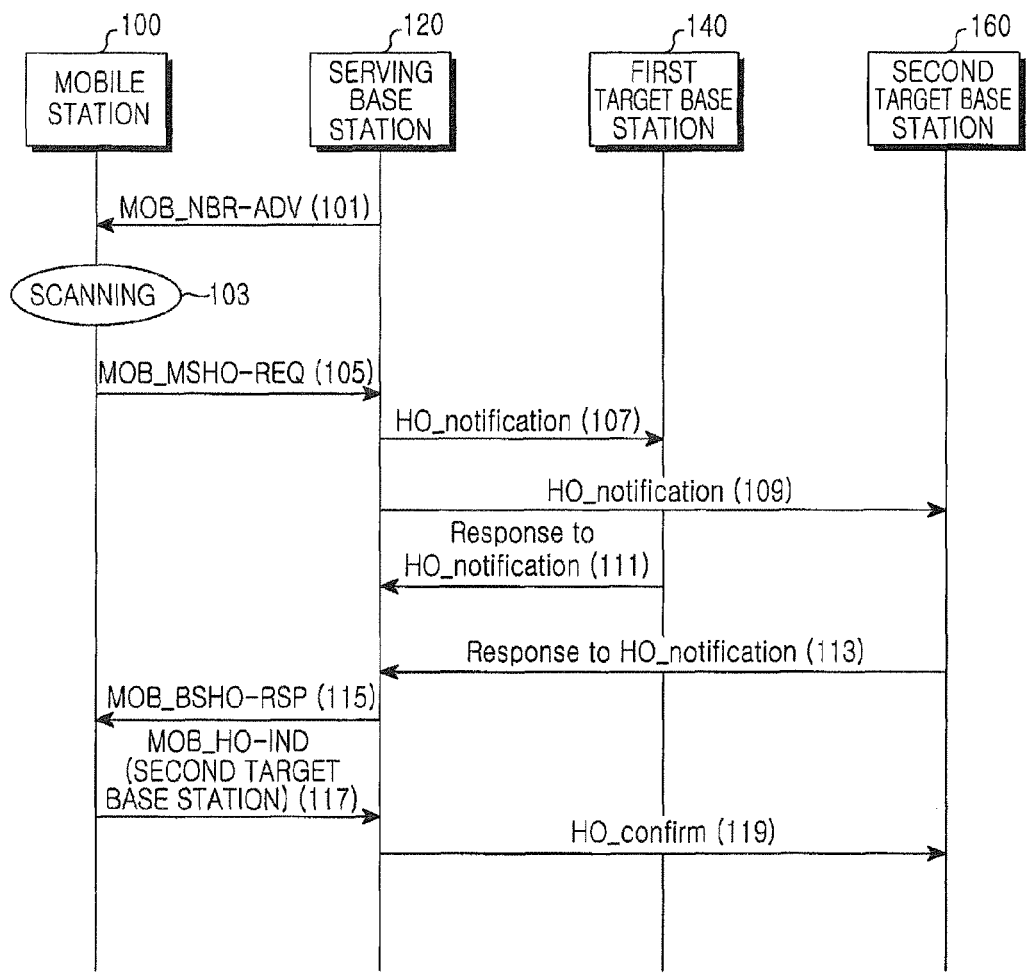
FIG. 1 shows the flow of signals during a handover procedure in a communication system according to the prior art.
Figure 2:
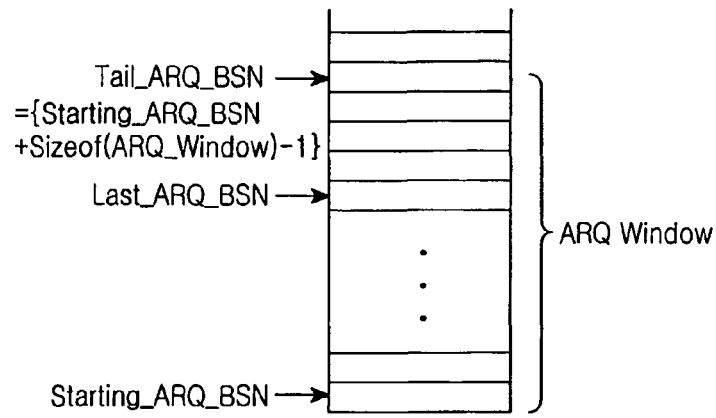
FIG. 2 shows the status of transmission/reception ARQ buffers of a serving base station according to an embodiment of the present invention.
Figure 2:
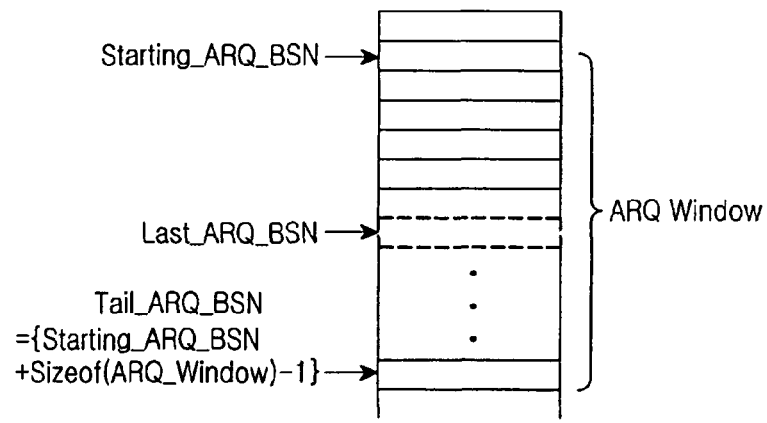

FIG. 2 shows the transmission and reception ARQ buffer status of the serving base station according to an embodiment of the present invention.

Referring to FIG. 2, the Starting-ARQ_BSN in the ARQ transmission buffer of the serving base station denotes the starting value of the ARQ window, particularly, the sequence number of an ARQ block having the smallest block sequence number value among packets (i.e., ARQ blocks) constituting the ARQ window. The Last_ARQ-BSN in the ARQ transmission buffer of the serving base station denotes the sequence number of an ARQ block, which must be newly transmitted to the MS the next time, among ARQ blocks remaining in the ARQ transmission buffer. Therefore, the value of the Last_ARQ_BSN is larger than or equal to that of the Starting_ARQ_BSN. The Tail_ARQ_BSN (tail ARQ block sequence number) in the ARQ transmission buffer of the serving base station is set as "Starting_ARQ_BSN+size of (ARQ_Window)-1". In this case, "size of ARQ_Window" refers to the size of the ARQ window, which is determined during an initial network entry procedure for each MS. ARQ blocks corresponding to the [Starting_ARQ_BSN, Last_ARQ_BSN] section in the ARQ transmission buffer of the serving base station are ARQ blocks transmitted to the MS by the serving base station.

The Starting_ARQ-BSN in the ARQ reception buffer of the serving base station denotes the starting value of the ARQ window, particularly the sequence number of an ARQ block having the smallest block sequence number value among packets (i.e., ARQ blocks) constituting the ARQ window. The Last_ARQ_BSN in the ARQ reception buffer of the serving base station denotes the sequence number of an ARQ block having the largest block sequence number among ARQ blocks remaining in the ARQ reception buffer. Therefore, the value of the Last_ARQ_BSN is larger than or equal to that of the Starting_ARQ_BSN. The Tail_ARQ_BSN in the ARQ reception buffer of the serving base station is set as "Starting_ARQ_BSN+size of (ARQ_Window)-1". ARQ blocks corresponding to the [Starting_ARQ_BSN, Last_ARQ-BSN] section in the ARQ reception buffer of the serving base station are ARQ blocks that the serving base station has already received from the MS.

The Valid_ARQ_BSN and Reset_Status in the ARQ status information are used to manage the ARQ status information. The Valid_ARQ_BSN is used to confirm whether or not there exists an ARQ block that has undergone a time-out in the target base station, to which the MS has decided to hand over, as well as to detect an ARQ block that has undergone the time-out. In other words, the Valid_ARQ_BSN denotes the number of the first one of packets, the lifetime of which has not yet expired, in the ARQ window.

For example, ARQ blocks belonging to the [Starting_ARQ_BSN, Valid_ARQ_BSN] are ARQ blocks that have undergone a time-out in the serving base station and thus must have been deleted from the transmission/reception buffer, or ARQ blocks that have been remaining in the transmission/reception buffer because neither ACK nor NACK has been received from the MS although the serving base station has instructed that the corresponding ARQ blocks be deleted. Therefore, after receiving such status information from the serving base station, the target base station transmits ARQ blocks belonging to the [Starting_ARQ_BSN, Valid_ARQ-BSN] to delete them after the MS completes the handover.

The Reset_Status is used to indicate whether or not the serving base station has transmitted a message to the MS to instruct it to initialize the ARQ status information. Upon receiving a message with the value of the Reset_Status set as "1" from the serving base station, the target base station must transmit a message instructing ARQ status information initialization to the MS after the MS completes the handover.

As mentioned above, the serving base station transmits ARQ status information to the target base station as the MS hands over. A HO_confirm message or a context report message may be used to transmit the ARQ status information. The following Table 1 shows an HO_confirm message containing ARQ status information. Each field contained in the HO_confirm message shown in Table 1 may described in a TLV (Type/Length/Value) format.

TABLE 1

| IE (Information Element) Name | Description | M/O |
|---|---|---|
| MS Info | | M |
| MS ID | | M |
| SF Info (one or more) | | O |
| SFID | | M |
| Data Integrity Info | | O |
| ARQ Window Info | | O |
| Starting ARQ BSN | Indicates the ARQ_TX_WINDOW_START (Transmitter) or ARQ_RX_WINDOW_START (Receiver). | M |
| Last ARQ BSN | Indicates the ARQ_TX_NEXT_BSN (Transmitter) or ARQ_RX_HIGHEST_BSN (Receiver). | M |
| Valid ARQ BSN | Indicates the BSN of the NOT Discarded ARQ Block in the ARQ window. (Downlink SF only) | M |
| Reset status | Indicates whether ARQ reset was pending at the Serving BS before HO. | M |

As mentioned above, the ARQ status information is used to indicate whether or not ARQ blocks have been delivered from the serving base station to the target base station in response to a handover of the MS, as well as to reconstruct the ARQ window and the ARQ state machine by the target base station. If ARQ blocks belonging to the [Starting_ARQ_BSN, Last_ARQ_BSN] have been delivered from the serving base station to the target base station, the target base station considers that no ACK has been received in connection with the ARQ blocks transmitted by the serving base station, and transmits ARQ blocks in connection with which no ACK has been received.

If ARQ blocks belonging to the [Starting_ARQ_BSN, Last_ARQ_BSN] have not been delivered from the serving base station to the target base station, the target base station considers that the ARQ blocks belonging to the [Starting_ARQ_BSN, Last_ARQ_BSN] have already been transmitted by the serving base station.

The target base station restores the ARQ buffer status by using the ARQ status information contained in the HO_confirm or context response message. The target base station may also consider whether or not ARQ blocks transmitted via a separate data path should be discarded while resetting the ARQ state machine.

The target base station allocates a reception buffer with regard to each uplink SF (Service flow), and stores ARQ blocks received from the serving base station in the reception buffer based on consideration of the Starting_ARQ_BSN and Last_ARQ_BSN values. The target base station deletes ARQ blocks, the BSN value of which is smaller than the Valid_ARQ_BSN value, from the reception buffer, and transmits a deletion instruction message to the MS to instruct it to delete corresponding ARQ blocks.

The target base station also allocates a transmission buffer with regard to each downlink SF, and stores ARQ blocks received from the serving base station in the transmission buffer based on consideration of the Starting_ARQ_BSN and Last_ARQ_BSN values. The target base station deletes ARQ blocks, the value of which is smaller than the Valid_ARQ_BSN value, from the transmission buffer, and transmits a deletion instruction message to the MS to instruct it to delete corresponding ARQ blocks.

If the target base station fails to receive an ACK message from the MS with regard to ARQ blocks belonging to the [Valid_ARQ_BSN, Last_ARQ_BSN] section within a predetermined period of time after the MS has completed the handover, the target base station retransmits ARQ blocks belonging to the [Valid_ARQ_BSN, Last_ARQ_BSN] section to the MS. After completing the transmission of the ARQ blocks belonging to the [Valid_ARQ_BSN, Last_ARQ_BSN] section, the target base station transmits ARQ blocks corresponding to the Last_ARQ_BSN to the MS.

If the target base station receives an HO_confirm message with the value of the Reset_status set to 1, the target base station discards all ARQ blocks within the ARQ window received from the serving base station, and initializes the ARQ state machine. Based on this, the target base station transmits a message to the MS to instruct it to initialize the ARQ state machine.

Figure 3:
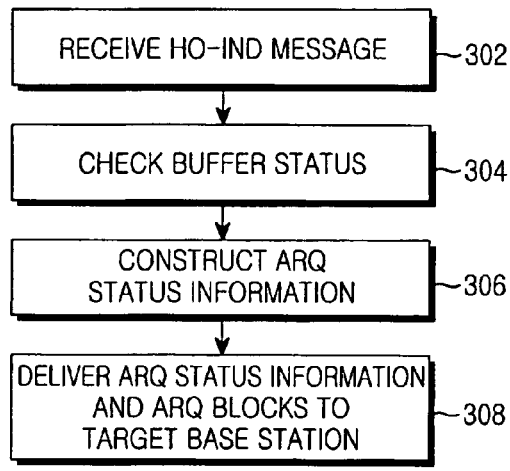
FIG. 3 is a flowchart showing the operation process of a serving base station according to an embodiment of the present invention.

FIG. 3 shows the operation process of a serving base station according to an embodiment of the present invention.

Referring to FIG. 3, the serving base station receives an HO-IND message from the mobile station in step 302, and proceeds to step 304. After receiving the HO-IND message, the serving base station stops transmitting and receiving ARQ blocks to and from the mobile station. The serving base station checks the status of the transmission and reception buffers in step 304, and proceeds to step 306. The serving base station constructs ARQ status information in step 306, and proceeds to step 308. The ARQ status information includes Starting_ARQ_BSN, Last_ARQ_BSN, Valid_ARQ_BSN, and Reset_status. The serving base station transmits the constructed ARQ status information and ARQ blocks, which have been stored in the serving base station, to the target base station in step 308.

Figure 4:
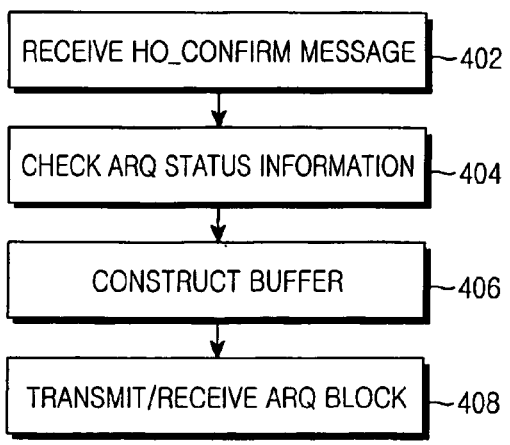
FIG. 4 is a flowchart showing the operation process of a target base station according to an embodiment of the present invention.

FIG. 4 is a flowchart showing the operation process of a target base station according to an embodiment of the present invention.

Referring to FIG. 4, the target base station receives an HO_confirm message containing ARQ status information from the serving base station in step 402, and proceeds to step 404. The target base station checks the ARQ status information contained in the HO_confirm message in step 404, and proceeds to step 406. The target base station constructs transmission and reception buffers based on consideration of the ARQ status information in step 406, and proceeds to step 408. The target base station transmits and receives specific ARQ blocks within the ARQ window to and from the mobile station in step 408.

As described above, the method and system for delivering and constructing status information in a communication system according to the present invention is advantageous in that the transmission side in a communication system condenses status information and transmits it to the receiving side, which then restores the buffer based on the status information without wasting resources. This reduces the complexity regarding the delivery and construction of status information.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for delivering buffer status information to a target base station by a serving base station in a communication system, a mobile station having decided to hand over to the target base station, the method comprising the steps of:
constructing buffer status information containing a first parameter indicating the number of a smallest packet among packets within a predetermined section stored in a buffer, a second parameter indicating the number of a packet to be transmitted at a next point of time, a third parameter indicating the number of a first packet, lifetime of the first packet having not yet expired, and a fourth parameter indicating whether or not an instruction to initialize the buffer status information has been transmitted to the mobile station; and
transmitting a message containing the constructed buffer status information to the target base station.

2. The method as claimed in claim 1, wherein the predetermined section corresponds to the maximum number of packets transmittable at a point of time regardless of whether or not an ACK message is received from the mobile station.

3. The method as claimed in claim 1, wherein packets ranging from a packet corresponding to the first parameter to a packet preceding a packet corresponding to the second parameter are packets already transmitted to the mobile station.

4. The method as claimed in claim 1, wherein packets ranging from a packet corresponding to the third parameter to a packet preceding a packet corresponding to the second parameter are packets to be retransmitted from the target base station.

5. The method as claimed in claim 1, wherein the message containing the buffer status information is an HO-confirm message or a context-report message.

6. A method for constructing a buffer by a target base station in a communication system, the target base station being a target of handover of a mobile station, the method comprising the steps of:

receiving a message containing buffer status information from a serving base station, the buffer status information containing a first parameter indicating the number of a smallest packet among packets within a predetermined section stored in a buffer, a second parameter indicating the number of a packet to be transmitted at a next point of time, a third parameter indicating the number of a packet, no ACK message having been received from the mobile station in connection with the packet, and a fourth parameter indicating whether or not the serving base station has transmitted an instruction to initialize the buffer status information to the mobile station;

receiving packets delivered from the serving base station, the packets having been transmitted or supposed to be transmitted to the mobile station by the serving base station; and constructing a buffer based on consideration of the first to fourth parameters and the delivered packets.

7. The method as claimed in claim 6, wherein the predetermined section corresponds to the maximum number of packets transmittable at a point of time regardless of whether or not an ACK message is received from the mobile station.

8. The method as claimed in claim 6, wherein packets ranging from a packet corresponding to the first parameter to a packet preceding a packet corresponding to the second parameter are packets already transmitted from the serving base station to the mobile station.

9. The method as claimed in claim 6, further comprising a step of retransmitting packets to the mobile station, the packets ranging from a packet corresponding to the third parameter to a packet preceding a packet corresponding to the second parameter.

10. The method as claimed in claim 6, wherein the message containing the buffer status information is an HO-confirm message or a context-report message.

11. The method as claimed in claim 6, further comprising a step of discarding all packets delivered from the serving base station when the fourth parameter has been set to have a value indicating that the serving base station has transmitted an instruction to initialize the buffer status information to the mobile station.

12. A communication system comprising:

a mobile station;

a serving base station providing the mobile station with a service; and a target base station, the mobile station having decided to hand over from the serving base station to the target base station, wherein the serving base station constructs buffer status information containing a first parameter indicating the number of a smallest packet among packets within a predetermined section stored in a buffer, a second parameter indicating the number of a packet to be transmitted at a next point of time, a third parameter indicating the number of a first packet, lifetime of the first packet having not yet expired, and a fourth parameter indicating whether or not an instruction to initialize the buffer status information has been transmitted to the mobile station, and transmits a message containing the constructed buffer status information to the target base station, and the target base station receives a message containing buffer status information from the serving base station, the buffer status information containing a first parameter indicating the number of a smallest packet among packets within a predetermined section stored in a buffer, a second parameter indicating the number of a packet to be transmitted at a next point of time, a third parameter indicating the number of a first packet, lifetime of the first packet having not yet expired, and a fourth parameter indicating whether or not the serving base station has transmitted an instruction to initialize the buffer status information to the mobile station, receives packets delivered from the serving base station, the packets having been transmitted or supposed to be transmitted to the mobile station by the serving base station, and constructs a buffer based on consideration of the first to fourth parameters and the delivered packets.

13. The communication system as claimed in claim 12, wherein the predetermined section corresponds to the maximum number of packets transmittable at a point of time regardless of whether or not an ACK message is received from the mobile station.

14. The communication system as claimed in claim 12, wherein packets ranging from a packet corresponding to the first parameter to a packet preceding a packet corresponding to the second parameter are packets already transmitted to the mobile station by the serving base station.

15. The communication system as claimed in claim 12, wherein packets ranging from a packet corresponding to the third parameter to a packet preceding a packet corresponding to the second parameter are packets to be retransmitted to the mobile station by target base station.

16. The communication system as claimed in claim 12, wherein the message containing the buffer status information is an HO-confirm message or a context-report message.

17. A method for constructing a buffer by a target base station in a communication system, the target base station being a target of handover of a mobile station, the method comprising the steps of:

receiving a message containing buffer status information from a serving base station, the buffer status information containing a first parameter indicating the number of a smallest packet among packets within a predetermined section stored in a reception buffer, a second parameter indicating the number of a packet to be received at a next point of time, a third parameter indicating the number of a first packet, lifetime of the first packet having not yet expired in the serving base station, and a fourth parameter indicating whether or not the serving base station has transmitted an instruction to initialize the buffer status information to the mobile station;

receiving packets delivered from the serving base station, the serving base station having received the packets from the mobile station; and constructing a reception buffer based on consideration of the first to fourth parameters and the delivered packets.

18. The method as claimed in claim 17, wherein the predetermined section corresponds to the maximum number of packets receivable at a point of time regardless of whether or not the mobile station has received an ACK message.

19. The method as claimed in claim 17, wherein packets ranging from a packet corresponding to the first parameter to a packet corresponding to the second parameter are packets already received by the mobile station from the serving base station.

20. The method as claimed in claim 17, further comprising a step of transmitting a deletion instruction to instruct the mobile station to delete packets ranging from a packet corresponding to the first parameter to a packet corresponding to the third parameter, a time-out having happened to the packets.

* * * * *